(12) United States Patent
Boyle et al.

(10) Patent No.: US 9,898,720 B2
(45) Date of Patent: Feb. 20, 2018

(54) CREDIT INSTRUMENT AND SYSTEM PROVIDING MULTIPLE SERVICES INCLUDING ACCESS TO CREDIT SERVICES AND ACCESS TO A SERVICE PROVIDER CLUB

(71) Applicant: JPMorgan Chase Bank, N.A., New York, NY (US)

(72) Inventors: Kevin Boyle, Hockessin, DE (US); Marty Maistre, Newark, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 85 days.

(21) Appl. No.: 14/011,798

(22) Filed: Aug. 28, 2013

(65) Prior Publication Data

US 2013/0346289 A1    Dec. 26, 2013

Related U.S. Application Data

(63) Continuation of application No. 12/692,137, filed on Jan. 22, 2010, which is a continuation of application
(Continued)

(51) Int. Cl.
*G06F 17/00* (2006.01)
*G06Q 40/00* (2012.01)
(Continued)

(52) U.S. Cl.
CPC .......... *G06Q 20/0855* (2013.01); *G06K 5/00* (2013.01); *G06Q 20/02* (2013.01); *G06Q 20/04* (2013.01);
(Continued)

(58) Field of Classification Search
USPC .......... 235/375, 379, 380, 383, 492
See application file for complete search history.

(56) References Cited

U.S. PATENT DOCUMENTS 5,276,311 A * 1/1994 Hennige .................. 235/380
5,530,232 A * 6/1996 Taylor .................. 235/380
(Continued)

FOREIGN PATENT DOCUMENTS

EP      950968 A1 * 10/1999

OTHER PUBLICATIONS (DoD) FDCH Federal Department and Agency Documents Feb. 23, 1996; Friday Service Officials Explain New Club Card Program Length: 1995 words.*

(Continued)

*Primary Examiner* — William Rankins
(74) *Attorney, Agent, or Firm* — LeClairRyan, a Professional Corporation

(57) ABSTRACT

An apparatus and methods for a card that allows a cardholder to set up auto-charge payment of dues and fees to a series of clubs, merchants or service providers. The card also may be used for other transactions that accept credit cards. The apparatus includes a database containing information of the associated clubs, merchants and service providers, so that applicants and cardholders can easily configure auto-charging for multiple business concerns in one sitting. The apparatus may process auto-charge transactions in an automated fashion without requiring a cardholder to submit payment authorization or the business concern to submit a charge for each payment. Inconvenience and administrative costs to the cardholder and the business concern are reduced. The system and method provide a competitive advantage to the associated business concerns to secure the initial account and then to maintain it. The system and method encourages card loyalty of both the card members and the business concerns to the card provider.

10 Claims, 8 Drawing Sheets

Related U.S. Application Data

No. 11/390,177, filed on Mar. 28, 2006, now Pat. No. 7,676,429, which is a continuation of application No. 11/051,764, filed on Feb. 7, 2005, now Pat. No. 7,499,887, which is a continuation of application No. 09/325,536, filed on Jun. 4, 1999, now Pat. No. 6,882,984.

(51) Int. Cl.

| | |
|---|---|
| *G06K 5/00* | (2006.01) |
| *G06K 15/00* | (2006.01) |
| *G06K 19/06* | (2006.01) |
| *G06Q 20/08* | (2012.01) |
| *G06Q 20/02* | (2012.01) |
| *G06Q 20/04* | (2012.01) |
| *G06Q 20/10* | (2012.01) |
| *G06Q 20/14* | (2012.01) |
| *G06Q 20/24* | (2012.01) |
| *G06Q 20/40* | (2012.01) |
| *G06Q 30/02* | (2012.01) |
| *G06Q 40/02* | (2012.01) |
| *G06Q 20/34* | (2012.01) |

(52) U.S. Cl.
CPC ........... *G06Q 20/102* (2013.01); *G06Q 20/14* (2013.01); *G06Q 20/24* (2013.01); *G06Q 20/34* (2013.01); *G06Q 20/40* (2013.01); *G06Q 20/405* (2013.01); *G06Q 30/02* (2013.01); *G06Q 40/00* (2013.01); *G06Q 40/025* (2013.01)

(56) References Cited

U.S. PATENT DOCUMENTS

| | | | | |
|---|---|---|---|---|
| 5,590,038 | A | * | 12/1996 | Pitroda .......................... 705/41 |
| 5,969,318 | A | * | 10/1999 | Mackenthun ................. 235/380 |
| 6,742,704 | B2 | * | 6/2004 | Fitzmaurice et al. ........ 235/380 |
| 7,360,693 | B1 | * | 4/2008 | Sullivan ....................... 235/380 |
| 2002/0065712 | A1 | * | 5/2002 | Kawan ............................ 705/14 |

OTHER PUBLICATIONS

3Com ATM Network Enables Guilford College to Implement Campus-Wide Fully Integrated "Smart Card" System. Business Wire , p. 2040078 Feb. 4, 1998.*

Sam's Club revamps membership cards; [Final Edition] Bloomberg Business News. The Commercial Appeal. Memphis, Tenn.: Aug. 29, 1995.*

Playing with a new deck Randy Brown Buildings; Jul1998.*

Price—Costco Plans Credit Card of Its Own Scott Fagerstrom, The News Tribune. The News Tribune. Tacoma, Wash.: Mar. 1, 1996.*

FDCH Federal Department and Agency Documents 23, 1996; Service Officials Explain New Club Card Program Agency: Department of Defense.*

* cited by examiner

| 300 | 305 | 310 | 315 | 320 |
|---|---|---|---|---|
| AIR FORCE | ARMY | NAVY | ... STATE UNIVERSITY | ... OTHER PARTNERS |

FIG. 3

| 400 | 405 | 410 | 415 |
|---|---|---|---|
| NAVY BASE NORFOLK | NAVY BASE WASHINGTON, D.C. | ... NAVY BASE CECIL FIELD | ... OTHER PARTNER BASES |

FIG. 4

| 500 | 505 | 510 | 515 | 520 | 525 | 530 |
|---|---|---|---|---|---|---|
| PARTNER | MERCHANT CODES | NAME | TYPE | ADDRESS/ PHONE | MANAGER NAME | INSTALLATION ID |

FIG. 5

| 605 | 610 | 615 | 620 | 625 | 630 | 635 | 640 |
|---|---|---|---|---|---|---|---|
| DESCRIPTION | FREQUENCY | ID | INSTALLMENT/ LUMP FEE | CANCELLATION POLICY | REFUND POLICY | PROMOTIONAL RATES | PRICE/FEE |

FIG. 6

| AUTO-CHARGE DATA | | | | MILITARY | | | | |
|---|---|---|---|---|---|---|---|---|
| FREQUENCY | NUMBER OF PAYMENTS | AMOUNT | DATE | NAME/ ADDRESS | PHONE | STATUS | RANK | AGENT CODE |
| 705 | 710 | 715 | 717 | 725 | 730 | 735 | 740 | 745 |

700

720

| CARD NO. | MEMBER ID | MERCHANT CODES | ... | OTHER ACCOUNT DATA |
|---|---|---|---|---|
| 750 | 755 | 760 | | 770 |

FIG. 7

CREDIT INSTRUMENT AND SYSTEM PROVIDING MULTIPLE SERVICES INCLUDING ACCESS TO CREDIT SERVICES AND ACCESS TO A SERVICE PROVIDER CLUB

RELATED APPLICATIONS

This application incorporates by reference and is a continuation of U.S. patent Ser. No. 12/692,137, field on Jan. 22, 2010, which is a continuation of U.S. patent application Ser. No. 11/390,177, issued as U.S. Pat. No. 7,676,429, filed on Mar. 28, 2006, which is a continuation of U.S. patent application Ser. No. 11/051,764, issued as U.S. Pat. No. 7,499,887, filed on Feb. 7, 2005, which is a continuation of U.S. patent application Ser. No. 09/325,536, issued as U.S. Pat. No. 6, 882,984, filed Jun. 4, 1999.

FIELD OF THE INVENTION

The present invention relates generally to a system and method for providing credit instruments whereby the credit processing system is preconfigured with a series of participating clubs, merchants, or service providers such that an applicant can provide for automated payment of dues and fees without having to engage in a separate transaction with each club, merchant or service provider.

BACKGROUND OF THE INVENTION

It is increasingly common that consumers pay for many of their expenses using credit cards, bankcards or like instruments rather than using cash or checks. Consumers do this because they find it more convenient that sending cash or checks. Using credit cards in this fashion is also desirable because the consumer can borrow using his/her credit card when personal funds are low, and also because an itemized list of payments is generated each month.

Some clubs, merchants or service providers may require fixed payments on a periodic basis, such as weekly, monthly, semi-annually, and so forth. In the case of a club, such as a health club, a consumer may be required to send dues each month. Using a credit card, the consumer may send in a payment slip each month with the credit card number, expiration date and a signature authorizing the charge to the consumer's credit card. Or the consumer may call the club's place of business to give like information verbally over the phone. Or the consumer may contact the club to give like information using a home computer accessing the Internet.

In each case the consumer is relieved of the inconvenience of sending cash, checks or the equivalent. Yet in each case the consumer still must initiate the transaction each month by mail, telephone or computer. For the customer associated with a number of clubs requiring periodic payments, this may involve a significant number of transactions for the consumer to initiate each week or month. Moreover, since payment due dates may differ for each club, the consumer cannot make the overall task more efficient by doing all the payments at once unless he/she is willing to pay some bills early or some bills late. Thus, this approach to paying bills using a credit instrument has significant shortcomings for the consumer.

From the perspective of the club, processing credit card information is advantageous since processing tends to be easier than for checks. However, there are still significant shortfalls. The club must await the submission of payment from the consumer for each cycle. Sometimes consumers will be late in contacting the club to submit their credit card information. Sometimes communication lapses will result in incorrect information being submitted to the club, such as when the consumer fills in the wrong credit card information or a customer service representative misunderstands information given over the telephone.

And even when no such difficulties arise, the club still must initiate the transaction with the card provider by submitting a separate charge for each consumer on each payment cycle. For a club having hundreds or thousands of members, this may entail the initiation of hundreds or thousands of charges at different times. This is a significant disadvantage because of the time and costs imposed on the club. Additionally, charges may be imposed on the club and/or the card provider when an interchange processor is contacted for each transaction initiated by the club. Additionally, there may be communications difficulties in contacting a card provider bank or interchange to submit the charge, such as when a direct-dial connection fails or an Internet or like computer network connection fails.

Sometimes a consumer will give a club permission to bill his/her credit card on an ongoing basis so that the consumer does not have to initiate payment each cycle. While this may lighten the burden on the consumer somewhat, it does not eliminate the burden on the club, which still must submit a charge to the consumer's credit card each cycle. Moreover, the consumer must still engage in an initial transaction with each club, merchant or service provider, to grant this authorization to bill the consumer's credit card on a periodic basis. For the consumer wishing to give such authorization to multiple clubs, merchants or service providers, a series of separate transactions must be undertaken. This is a significant shortcoming.

Other problems and drawbacks also exist.

SUMMARY OF THE INVENTION

For these and like reasons, what is desired is a system and method of providing a credit card system that is associated with a series of clubs, merchants, service providers or the like so that a fully automated payment of dues or fees can be effectuated with minimal transactions.

Accordingly, it is one object of the present invention to overcome one or more of the aforementioned and other limitations of existing systems and methods for payment of fees or dues using a credit instrument.

It is another object of the invention to provide a credit instrument that is pre-associated with a series of clubs, merchants or service providers so that a cardholder can authorize automated payment for multiple business concerns in a single transaction with the card provider.

It is another object of the invention to provide such a credit instrument where the information for multiple business concerns is stored at a credit system processor so that the creation of automated payment agreements for a consumer for a plurality of such business concerns is easily effectuated.

It is another object of the invention to provide a credit instrument application system where an applicant is solicited to join clubs and set up automated payment agreements at the same time the application is being processed so that a competitive marketing advantage is conferred on the associated business concerns.

It is another object of the invention to provide such a credit instrument associated with a series of business concerns such that a competitive advantage is conferred on the associated business concerns because the cardholder is encouraged to maintain the accounts therewith.

It is another object of the invention to provide such a credit instrument associated with a series of business concerns that provides a competitive advantage for the card provider by maximizing revenue and creating barriers to exit for both the associated business concerns and the cardholders.

To achieve these and other objects of the present invention, and in accordance with the purpose of the invention, as embodied and broadly described, an embodiment of the present invention comprises an apparatus and method for a card that allows a cardholder to set up auto-charge payment of dues and fees to a series of clubs, merchants or service providers. The card also may be used for other transactions that accept credit cards. The system includes a database containing information of the associated clubs, merchants and service providers, so that applicants and cardholders can easily configure auto-charging for multiple business concerns in one sitting. The system may then process auto-charge transactions in an automated fashion without requiring a cardholder to submit payment authorization or the business concern to submit a charge for each periodic payment. Inconvenience and administrative costs to the cardholder and the business concerns are greatly reduced. The system and method provide a competitive advantage to the associated business concerns to secure the initial account and then to retain it. The system and method encourages card loyalty of both the card members and the business concerns to the card provider.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which:

FIG. 3 is a block diagram according to an embodiment of the invention illustrating data that may be stored by the system for various partners.

FIG. 4 is a block diagram according to an embodiment of the invention illustrating data that may be stored in the system for installations corresponding to an associated partner.

FIG. 5 is a block diagram according to an embodiment of the invention illustrating data that may be stored in the system for a club, merchant or service provider.

FIG. 6 is a block diagram according to an embodiment of the invention illustrating data that may be stored in the system for auto-charging dues or fees for a club, merchant or service provider.

FIG. 7 is a block diagram according to an embodiment of the invention illustrating data that may be stored in the system for a member or cardholder.

DETAILED DESCRIPTION OF THE INVENTION

As discussed in the Summary of the Invention, the present invention is directed to a method and apparatus for a credit instrument that supports auto-charging to clubs, merchants and service providers.

The auto-charge feature of the card can be used to automatically charge dues and fees to a cardholder's account for clubs, merchants, service providers and other business concerns. As can be appreciated by those skill in the art, the inventive concept is well-adapted to setting up auto-charging when there is an ongoing relationship between the cardholder and the business concern, such as a health club, where payments are to be made each month. For the sake of clarity and brevity of this detailed description, the explanation of the invention shall be discussed in terms of associated "clubs," although it is to be understood that this also embraces merchants, service providers and other business concerns.

Additionally, the description will refer to "partners." Partners may be entities that are associated with a number of clubs, such as a university or military branch. A partner may provide data to a card provider of a number of clubs so that applicants (e.g., students or alumni or service members) can easily join up and set up auto-charge arrangements therewith. By "partnering" with the card provider, both the partner and the card provider derive benefits of bringing the plurality of clubs into the system. Of course, those of skill in the art will recognize that the benefits of the system can be derived where there are no partners, i.e., where clubs become participants in the system without an intermediate partner.

Overview of the System

Figure 1:
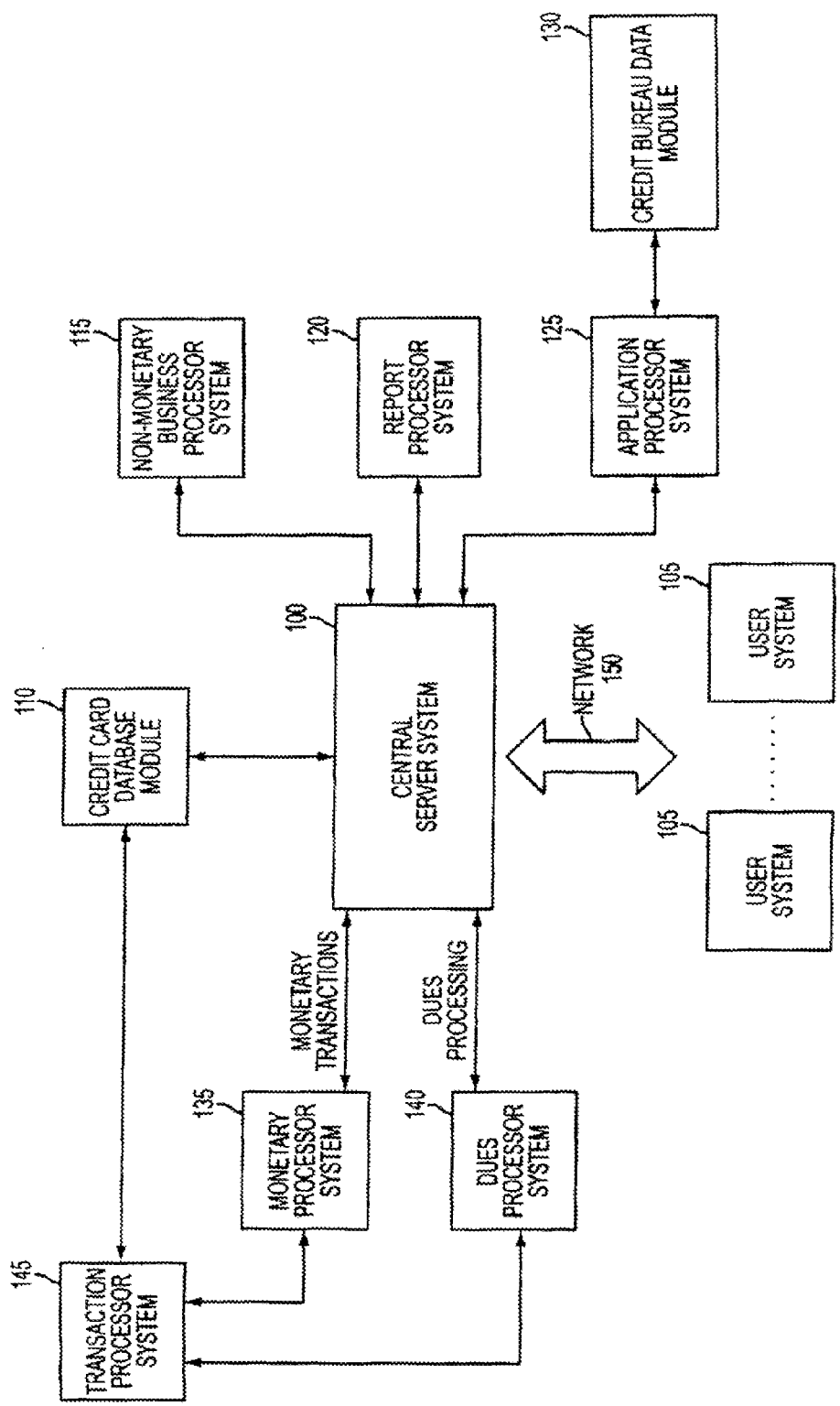
FIG. 1 is a block diagram of the credit card processing system according to an embodiment of the invention, including the network, central server system, user systems, credit card database and various processor systems.

FIG. 1 depicts an overview of the system, according to an embodiment of the present invention, including central server system 100; network 150; user systems 105; credit card database module 110; non-monetary business processor system 115; report processor system 120; application processor system 125; credit bureau data module 130; monetary processor system 135; dues processor system 140; and transaction processor system 145.

Central server system 100 may comprise a server system for receiving applications, maintaining a database, processing transactions and interfacing with user systems over network 150. Generally, central server system 100 includes hardware and software for supporting system administration, database management, application and transaction processing, report generation, and network-related operations. In one embodiment, control server system 100 may interface with user systems 105 over the Internet or like packet-switched networks. In such an embodiment, central server system 100 may have software to support graphical user interface (GUI) with user systems 105 through browser pages or the like (e.g., incorporating HTML or XML markup language) so that users need little or no specialized hardware or software.

Central server system 100 may use server hardware running Microsoft NT™ and using Oracle v. 7.3.4 for database operations. Central server system 100 may support network related operations using software such as Weblogic™ v.3.1 for Unix. Software for processing transactions and applications is well known in the art and, for example, may be programmed in high level languages such as C++. Central server system 100 may be a secure system employing encryption technology, such as 128 bit SSL (secure sockets layer) encryption, to protect data transmitted over the network. Central server system 100 may also require a user name and password for a party to access the system over network 150. Central server system 100 may support interface with user systems 105 through the application of servlets and/or applets, know to those of skill in the art, for supporting a substantially platform independent interface with users who have "standard" computer hardware and software.

User systems 105 may comprise any system capable of interfacing with server system 100 over network 150. User systems 105 may comprise "standard" computer systems that do not require specialized hardware or software to interface with central server system 100. User systems 105 may comprise personal computers, microcomputers, minicomputers, portable electronic devices, a computer network or other system operable to send and receive data through network 150. In one embodiment, user systems 105 may comprise a personal computer running Windows NTT™ and Microsoft Internet Explorer™ 4.0.

Network 150 may comprise any network that allows communications amongst the components, and may encompass existing or future network technologies, such as the existing "Internet," "World Wide Web," Wide Area Network, "Internet Protocol-Next Generation" (Ipng) and like technologies. In one embodiment, network 150 comprises the Internet so that user systems 105 can access central server system 100 as a web site and interface therewith using standard browser pages.

Credit card database module 110 represents the storage media employed to store data for the system. Credit card database module 110 may be one or more physically distinct media, such as hard drives, floppy drives, CD-ROM and other existing or future storage technologies supporting ready access. Credit card database module 110 may store the account data for the system, such as transactions data, partner data (to be discussed further below), installation data (to be discussed further below), club data, auto-charge data, member data and so forth. Generally, this module stores records of member accounts (e.g., for posting charges and payments), records of associated partners and clubs, and records of auto-charge data.

Application processor system 125 is for processing credit card applications for the cards. Application processor 125 may communicate with credit bureau data module 130 for retrieving and evaluating information of an applicant's credit-worthiness in order to accept or deny an application. Application processor 125 may process applicant information submitted by an applicant through user system 105 and report results back to central server system 100, which may add the applicant to credit card database module 110 if an applicant is approved.

Report processor system 120 may extract data from the database (e.g., credit card database module 110) for reports to be generated periodically or by request. Report processor system 120 may present such reports as browser or like pages to user systems 105. In one embodiment, report processor 120 comprises Crystal Info™ software as the reporting engine. In one embodiment, report processor system 120 can be accessed over the Internet by users such as partners and/or clubs to retrieve information regarding partner club affiliation, club membership, account status and the like.

Non-monetary business processor system 115 may be a processing module supporting central server system 100 so that users can change certain information stored in credit card database module 110. A "user" generally refers to a party that is authorized to access central server system 100. In one embodiment, where a military branch is a partner, each base or installation may have a user authorized to accept applications and modify system data, such as changing the address of a cardholder stored in credit card database module 110. Generally, the card provider may have a plurality of persons authorized as users. In one embodiment, there is a plurality of levels of authorization for users, such that a card provider user may have access to all data, a partner user may have access only to that data pertaining to that partner, and a cardholder user may have access only to that data pertaining to the cardholder's account.

Monetary processor system 135 may comprise a module for submitting charges to a cardholder's account, such as charges, payments and adjustments. Monetary processor system 135 may submit a charge request, such as a merchant number, terminal ID, account number, charge amount and current date, to transaction processor system 145. Monetary processor system 135 is generally capable of operating in nominal real time so that charge requests are submitted for processing as they are received. In one embodiment, monetary processor system 135 is capable of processing so-called "on-us" charges submitted directly to the system (e.g., submitted directly to the card provider or bank) and so-called "not-on-us" charges submitted through an interchange (e.g., a Visa™ or MasterCard™ interchange, well known to those of skill in the art). Generally, monetary processor system 135 processes charges other than the auto-charges, such as merchant charges, adjustments, cardholder payments, and the like.

Dues processor system 140 prepares charge requests associated with auto-charge fees or dues. Dues processor system 140 generally processes "on-us" charges so that contacting an interchange is not required. Dues processor 140 will periodically (e.g., daily) determine the auto-charge payments required for cardholders. A set of transactions is prepared for "batch processing" and the transactions may be sent to transaction processor 145 as a group. In one embodiment, dues processor system 140 is also capable of preparing transactions from external files received, for example, from a utility on a daily basis. This function is similar to the auto-charge feature for clubs and the like, except the amount of each transaction may vary based on the data received from the external file. In another embodiment, dues processor system 140 is capable of preparing "special club" transactions, such as processing charges submitted based on a merchant code set up in the system for the "general's party" or like special occasion amenable to having charges submitted and processed in a group fashion.

Transaction processor system 145 processes the transactions for the system. Generally, transaction processor receives transaction requests, accesses an account database (see, e.g., credit card database module 110) and determines if the transaction is authorized or declined. Based on the result, the pertinent card member account and merchant account is updated as appropriate. In one embodiment, a transaction request may comprise a merchant number, terminal ID (identifying the terminal submitting the request), account number, charge amount, and current date. Several categories of merchant numbers may be available to identify the merchant and the nature of the transaction request. These categories may include dues billing, dues adjustment, special event, recurring charge (e.g., external file from a utility submitted on a daily basis), payment or other. A transaction request, as described above, may be submitted to transaction processor system 145, which may return a six-digit authorization code, a decline code, a decline and confiscate message or a call bank message. The transaction processor 145 or central server system 100 may post the result to the card member's account and transfer any payment to a club account (such as a direct deposit transaction).

Partners

Figure 2:
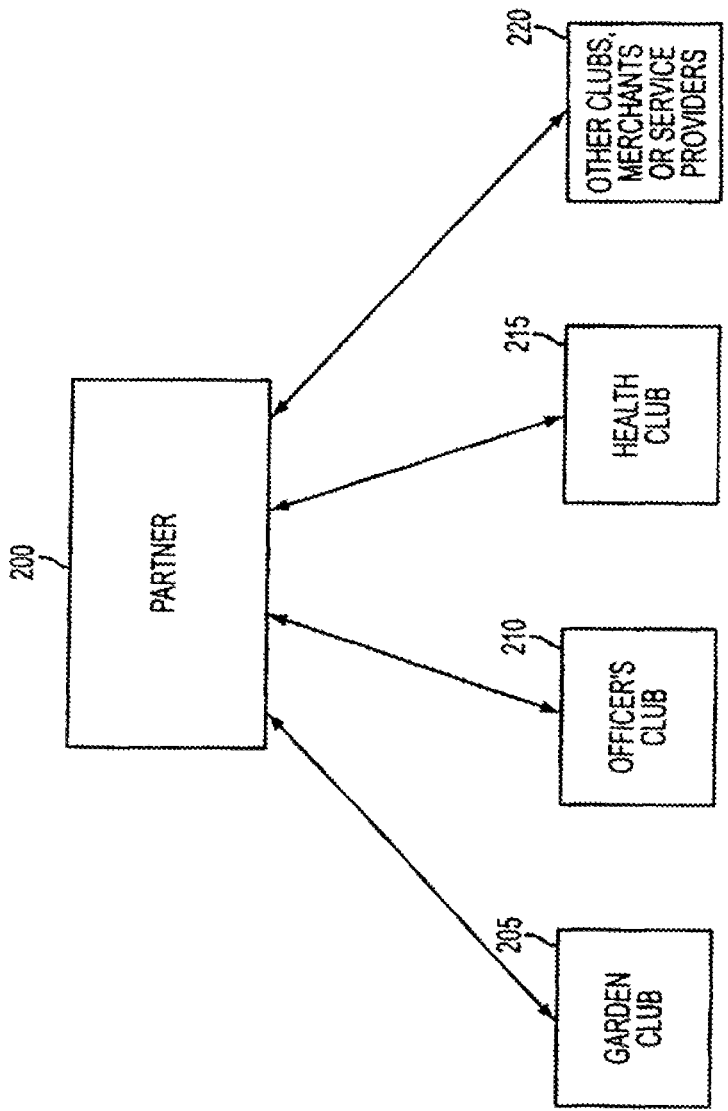
FIG. 2 is a block diagram according to an embodiment of the invention illustrating an exemplary partner and associated clubs, merchants or service providers.

FIG. 2 illustrates the concept of partners for the system. Partner 200 may be a military branch that is associated with a series of clubs such as garden club 205, officer's club 210, health club 215 and other clubs, merchants or service providers 220. More generally, a partner may comprise a business concern, group or association that itself is associated with a series of clubs or the like. For example, a partner may be a university or military branch that wishes to have data of its various clubs and the like entered onto the system so that students, alumni, or military personnel can readily join clubs and set up auto-charge payment arrangements. The benefits from such an arrangement to the card provider, partner and clubs are substantial.

As previously noted, the system can operate and provide substantial benefits without intermediate partners. Yet, it can be appreciated that the benefits and efficiencies may be maximized when the card provider has an arrangement with an intermediate partner associated with a number of constituent clubs.

Data in Credit Card Database 110

FIGS. 3-7 illustrate the types of data that may be stored in credit card database module 110. As those of skill in the art can appreciate, the allocation of the data types is functional and descriptive. Credit card database module 110 may be a fully relational database so that each data type can be associated with other data types as appropriate.

FIG. 3 illustrates the partner data that may be stored. In this exemplary embodiment, partner data includes Air Force 300, Army 305, Navy 310, State University 315 and other partners 320. Each represents a partner with whom the card provider is associated.

FIG. 4 illustrates the various "installations" in the system. An installation refers to a physical location of a partner that has a plurality of locations. In the military paradigm, an installation may correspond to a base. For example, for a Navy partner, the installations may include Navy Base Norfolk 400, Navy Base Washington D.C. 405, Navy Base Cecil Field 410, and other partner bases 415. By including installation data, the system can provide the appropriate club data for each base. For example, when a new recruit applies for a card at Navy Base Norfolk 400, the system may provide the appropriate list of clubs. When the new recruit is transferred to Navy Base Washington D.C. 405, the new recruit member data is easily "transferred" or reassigned to the new base without re-entering all of his/her data. Such installation data is also useful to the partner for evaluating billings per installation or club membership per installation.

FIG. 5 illustrates the club (or merchant or service provider, etc.) data that may be stored in credit card database module 110. In this exemplary embodiment, for a club there may be partner 500 (identifying the partner the club is associated with), merchant code(s) 505, name 510 (name of the club), type 515 (e.g., identifying whether the entity is a club, merchant, service provider, utility, etc.), address/phone 520, manager name 525 and installation ID 530 (identifying the installation). Regarding merchant code(s) 505, a club may be assigned several merchant codes to cover different types of transactions, such as dues and dues adjustment.

FIG. 6 illustrates the auto-charge data that may be stored in credit card database module 110. This data may be stored for a club to provide the various options for the auto-charge feature of the system. This way when a card member decides that he/she would like to automatically pay the officer's club, the appropriate data for that club is present in the system. In the exemplary embodiment of FIG. 6, the auto-charge data comprises description 605 (describing the club and/or nature of the auto-charge), frequency 610 (describing the frequency of payment such as daily, monthly, quarterly, etc.), ID 615 (identifying the club), installation/lump fee 620 (whether the club will accept installations or requires lump fees), cancellation policy 625 (explaining cancellation policy of the club), refund policy 630 (explaining the refund policy of the club), promotional rates 635 (providing promotional rates for, e.g., new members, or differential rate structures depending on rank or other personal characteristics), and price/fee 640 (price or fee for the club).

FIG. 7 illustrates an exemplary embodiment of the data that may be stored in credit card database module 110 for the cardholders. Cardholder data may comprise auto-charge data 700, which may further comprise frequency 705, number of payments 710, amount 715, and date 717 (provides date of the auto-charge payment, e.g., the 19th of each month). Auto-charge data 700 may have an entry for each club the cardholder is paying using the auto-charge feature. Military 720 lists data for a card member in the military, such as name/address 725, phone 730, status 735 (e.g., retired, active duty or reserve), rank 740, and agent code 745 (identifies the installation to which the cardholder belongs). The cardholder data may further comprise card number 750, member ID 755 (e.g., may be social security number), merchant codes 760 (identifies clubs/merchants/service providers that the cardholder is associated with), and other account data 770. In one embodiment, merchant codes 760 is also stored on the card so that the card not only supports normal credit card applications and the auto-charge capability, but can also function as a "door pass" that members may use to gain entry or authorization for clubs.

Graphical User Interfaces for the System

In one embodiment, central server system 100 interfaces with user systems 105 over the Internet or like packet-switched network using a standard GUI interface, such as browser pages accessed over the World Wide Web.

In this embodiment, there is a log in page for an authorized user, who must provide a user name and password. In this embodiment, there is a so-called "home page" which includes options for member lookup (for locating members), application processing (for processing applications), member maintenance (for changing member data, such as an address or installation), batch processing (for batch financial transactions), reports (for preparing reports) and administration (for profiles, maintenance of installations, clubs, and merchants). In this embodiment, there may be an application browser page for submitting an application over the Internet.

Methods of Using the System

Figure 8:
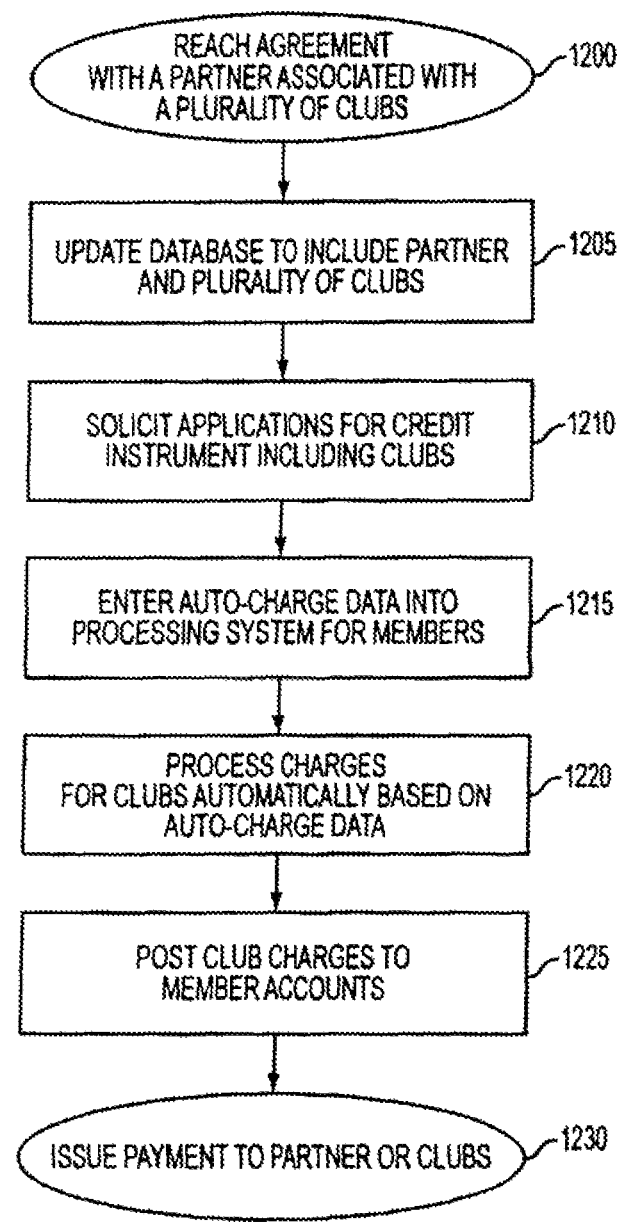
FIG. 8 is a flowchart illustrating a method, according to an embodiment of the invention, for a card provider to provide an auto-charge feature to cardholders for associated clubs, merchants and service providers.

According to an embodiment of the present invention, a method is provided for a credit card system that is associated with a series of clubs, merchants, service providers or the like so that a fully automated payment of dues or fees can be effectuated. Referring to FIG. 8, a card provider reaches an agreement with a partner associated with a plurality of clubs, according to step 1200. The card provider then updates a database to include the partner and plurality of clubs, as in step 1205 (e.g., see FIGS. 2, 3, 4, 5 and 6). In one embodiment, a card provider reaches such an agreement with a military branch which then provides data describing installations and clubs that could be stored in a database such as credit card database module 110. The card provider and/or partner solicits applications for the credit instrument and invites the applicant to join various clubs and/or set up auto-charge arrangements, according to step 1210. For example, the new recruit is invited to apply for a card and also to join various clubs such as the Officer's Club and golf club, for which the auto-charge feature may be set up. According to step 1215, auto-charge data is entered into the processing system (e.g., see FIG. 7) for each member selecting the auto-charge feature for a club. Based on the auto-charge data entered for the members, the system processes charges automatically, according to step 1220. Charges are posted to the members' accounts, according to step 1225. In one embodiment, steps 1220 and 1225 may be processed as batch transactions, as previously discussed. In one embodiment, steps 1220 and 1225 are performed as "on-us" transactions so that interchange fees are avoided, providing savings to the card provider and/or partner and/or clubs. In step 1230, payment is issued to the partner or clubs. In one embodiment, payment is issued to the partner, such as to a military base, by automated direct deposit. In another embodiment, it may be provided that payment is issued directly to clubs.

Figure 9:
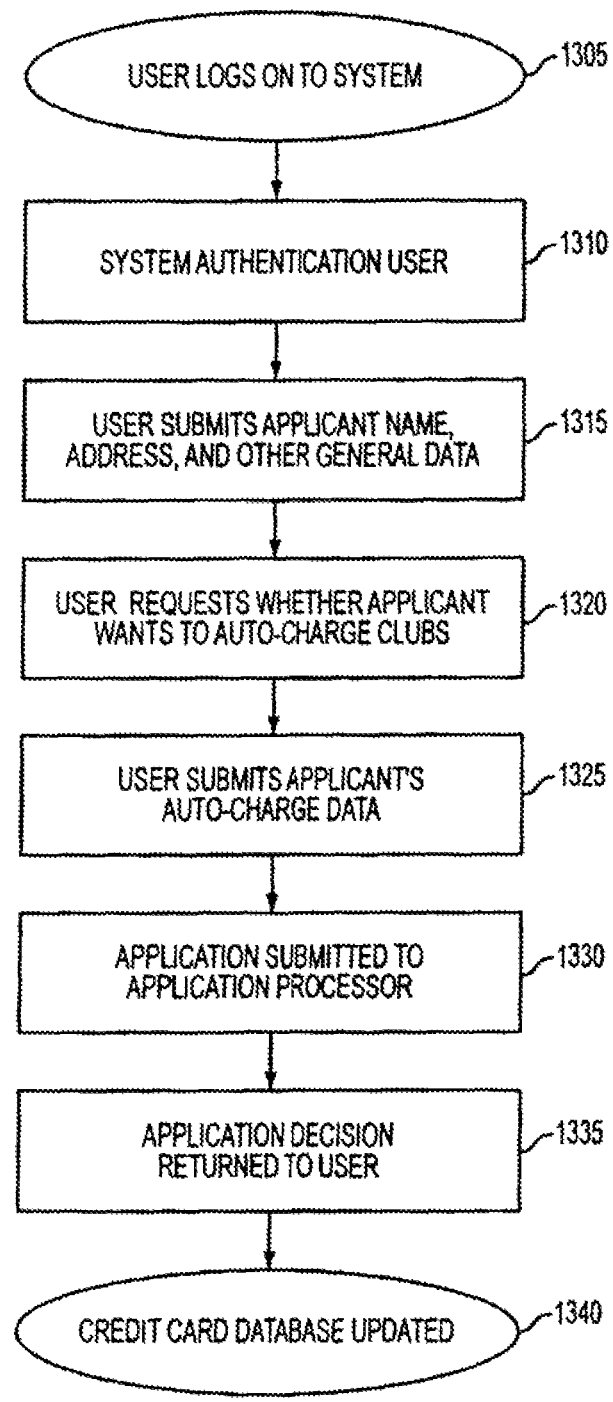
FIG. 9 is a flowchart illustrating a method, according to an embodiment of the invention, for a user of the system to process an application on behalf of an applicant, including the selection of auto-charge options for associated clubs, merchants and service providers.

According to an embodiment of the present invention, FIG. 9 depicts a method for processing an application for a credit card system that is associated with a plurality of clubs and that supports auto-charging. The user logs on to the system, as in step 1305, and the system authenticates the user, as in step 1310. In one embodiment, where the partner is a military branch, each installation or base may have an authorized user for accepting applications on behalf of service personnel. The user submits the applicant's name, address and other general data on behalf of the applicant, as in step 1315. The user requests whether the applicant wants to auto-charge certain clubs, as in step 1320. The user submits the applicant's auto-charge data, as in step 1325. The application is submitted to the application processor, as in step 1330 (e.g., see FIG. 1, application processor system 125). The application decision is returned to the user, as in step 1335. The credit card database is updated to include the applicant if the application is approved, as in step 1340 (e.g., see FIG. 1, credit card database module 110; FIG. 7).

Figure 10:
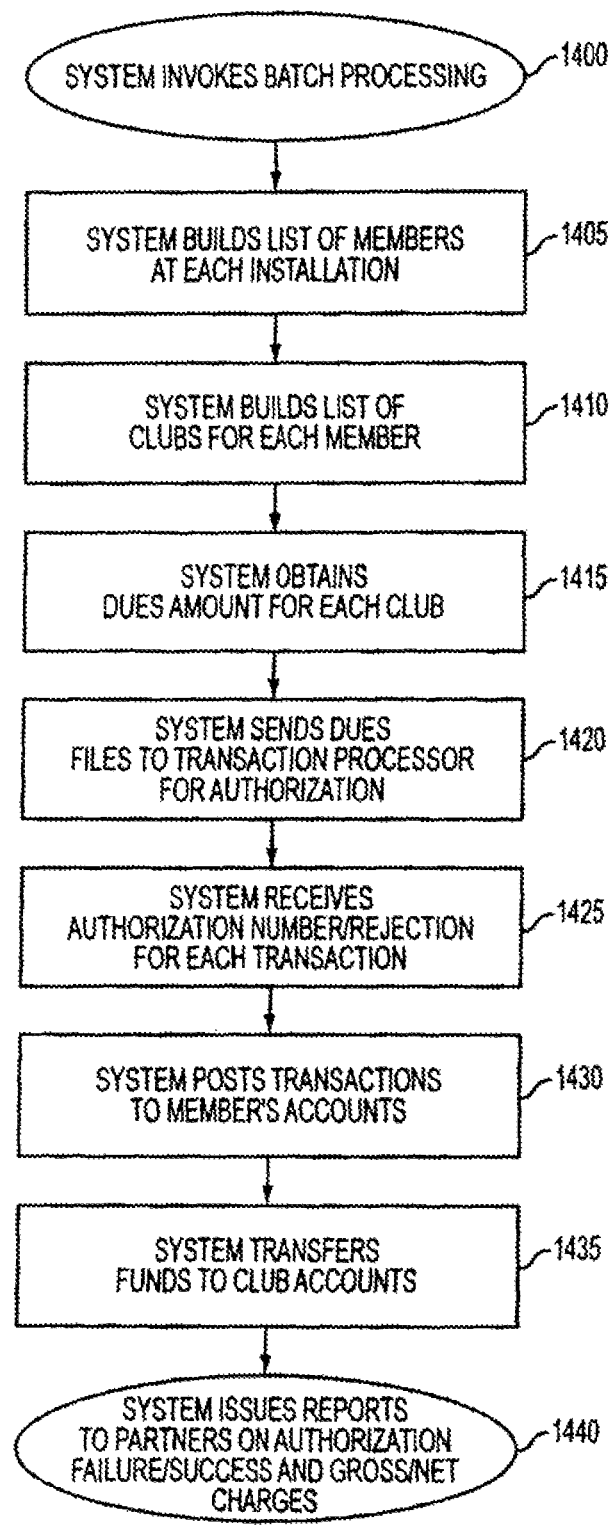
FIG. 10 is a flowchart illustrating a method, according to an embodiment of the invention, for the system to execute batch processing of auto-charge fees or dues for cardholders who have selected the auto-charge option for clubs, merchants or service providers.

According to an embodiment of the invention, FIG. 10 depicts a method of batch processing auto-charge dues or fees for the system. Referring to FIG. 10, the system (e.g., see FIG. 1, central server system 100) invokes the batch processing logic (e.g., see FIG. 1, dues processor system 140), according to step 1400. The server system builds a list of members at each installation or base, according to step 1405. The server system builds a list of clubs (for which the auto-charge option is enabled) for each member, according to step 1410. Central server system 100 obtains the dues or fees amount for each member, according to step 1415. The server system sends dues files (e.g., a batch of transaction requests) to transaction processor system 145 for authorization (e.g., see FIG. 1, transaction processor system 145), according to step 1420. The server system receives the results of the transaction requests, i.e., an authorization number or rejection for the transaction requests, as in step 1425. The server system posts the transactions to the members' accounts, as in step 1430. The server system transfers funds to club accounts, as in step 1435. The server system may then issue reports to partners on authorization failure/success and gross/net charges, as in step 1440.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A multiple service card associated with a service partner system and a holder, the card comprising:
    a datum identifying the multiple service card;
    club information providing a cardholder access to multiple clubs associated with a service partner allowing the cardholder to physically enter an establishment of the multiple clubs associated with the service partner system upon reading of the club information stored on the multiple service card;
    wherein the multiple service card is issued by the service partner system by performing at least the following:
        receiving, at the service partner system via a communication network, application data for the multiple service card, said application data comprising:
        credit card application data, and
        service partner data related at least in part to membership in a service partner club;
        analyzing, using a computer processor at the service partner system, the application data to evaluate if the cardholder should be granted membership into the service partner club,
        processing the application data to evaluate creditworthiness of the cardholder;
        generating a decision using the computer processor at the service partner system, indicating that the cardholder is approved to receive the multiple service card;
        updating one or more databases with a portion of the application data of the cardholder based on the decision, the one or more databases storing the application data and the service partner data; and
        providing the multiple service card;
    wherein, auto-charge data associated with an account of the cardholder, when processed, allows an auto-charge request to be automatically authorized and allows subsequent auto-charges to be processed automatically by processing the auto-charge data at the service partner system.

2. The multiple service card of claim 1, wherein said evaluating creditworthiness comprises a step of communicating at least a portion of the credit card application data of the application data to a credit service provider.

3. The multiple service card of claim 2, wherein further comprising receiving a determination of whether credit should be extended for the cardholder, and wherein said updating step is performed in response to said receiving.

4. The multiple service card of claim 1, wherein evaluating if the cardholder should be granted membership comprises evaluating whether access should be granted to the cardholder to purchase goods and services associated with the service partner system using the multiple service card.

5. The multiple service card of claim 1, wherein the service partner system associated with the multiple service card processes a charge submitted for processing associated with the multiple service card.

6. The multiple service card of claim 5, wherein the charge is an adjustment to charges associated with the multiple service card, wherein the adjustment is based on purchases of products or services from the service partner club.

7. The multiple service card of claim 1, wherein the multiple service card is associated with auto-charge data, said auto-charge data indicating selected clubs for auto-charging to the cardholder, said auto-charge data being stored in the database.

8. The multiple service card of claim 1, wherein the multiple service card is issued by the service partner system further by issuing to the cardholder the requested multiple service card that includes credit account information providing the cardholder access to credit services, wherein the credit account information is linked to auto- charge data stored in a credit card database, and that further includes club information stored on the multiple service card providing the cardholder access to multiple clubs associated with the service partner allowing the cardholder to physically enter an establishment of the multiple clubs associated with the service partner upon reading of the club information stored on the multiple service card.

9. The multiple service card of claim 1, wherein the multiple service card is subject to a cancelation policy.

10. The multiple service card of claim 1, wherein the multiple service card is associated with a plurality of service partners.

\* \* \* \* \*